US005881673A

United States Patent [19]

Beach et al.

[11] Patent Number: 5,881,673

[45] Date of Patent: Mar. 16, 1999

[54] HEAT DETECTION SYSTEM

[76] Inventors: Mark Beach, Rte. 2, Box 123, Bristow, Okla. 74010; Scot Tomlinson, 2011 E. 13th St., Tulsa, Okla. 74104

[21] Appl. No.: 937,959

[22] Filed: Sep. 25, 1997

[51] Int. Cl.[6] .................................................... A01K 21/00

[52] U.S. Cl. ............................................ 119/174; 600/551

[58] Field of Search .................................... 119/850, 858, 119/859, 174, 905, 906, 907, 908; 600/551; 200/85 R, 85 A, 86 R, 512, 514

[56] References Cited

U.S. PATENT DOCUMENTS

| | | | |
|---|---|---|---|
| 3,704,352 | 11/1972 | Fontaine | 200/85 R |
| 3,844,273 | 10/1974 | Polson | 128/2 R |
| 4,172,216 | 10/1979 | O'Shea | 200/85 R |
| 4,247,758 | 1/1981 | Rodrian | 235/92 MS |
| 4,317,011 | 2/1982 | Mazurk | 200/512 |
| 4,411,274 | 10/1983 | Wright | 128/738 |
| 4,455,610 | 6/1984 | Rodrian | 364/415 |
| 4,503,808 | 3/1985 | McAlister | 119/1 |
| 4,524,256 | 6/1985 | Miyata et al. | 200/86 R |
| 4,551,713 | 11/1985 | Aossey | 340/666 |
| 4,635,587 | 1/1987 | Leonardo | 119/1 |
| 4,643,193 | 2/1987 | DeMarzo | 128/639 |
| 4,784,155 | 11/1988 | Mills | 128/734 |
| 4,846,106 | 7/1989 | Leonardo | 119/1 |
| 4,895,165 | 1/1990 | Blair | 128/738 |
| 5,111,799 | 5/1992 | Senger et al. | 128/738 |
| 5,216,599 | 6/1993 | Uebe et al. | 364/413.12 |
| 5,542,431 | 8/1996 | Starzl et al. | 128/738 |

*Primary Examiner*—Michael J. Carone
*Assistant Examiner*—James S. Bergin
*Attorney, Agent, or Firm*—Molly D. McKay, P.C.

[57] ABSTRACT

A system for monitoring the time and number of times each cow in a herd is mounted for purposes of determining the most successful time to artificially inseminate cows. The system employs a single hand held receiving unit for remotely communicating with multiple individual recording units secured to the backs of the cattle. The receiving unit can remotely and selectively reset counters contained within the recording units and can remotely and selectively poll the recording units to obtain data on mounting activity for each cow. The data can be viewed on a display provided on the receiving unit or can be downloaded to a computer via a computer port provided on the receiving unit. The recording unit employs a unique switch for sensing mounting activity.

7 Claims, 4 Drawing Sheets

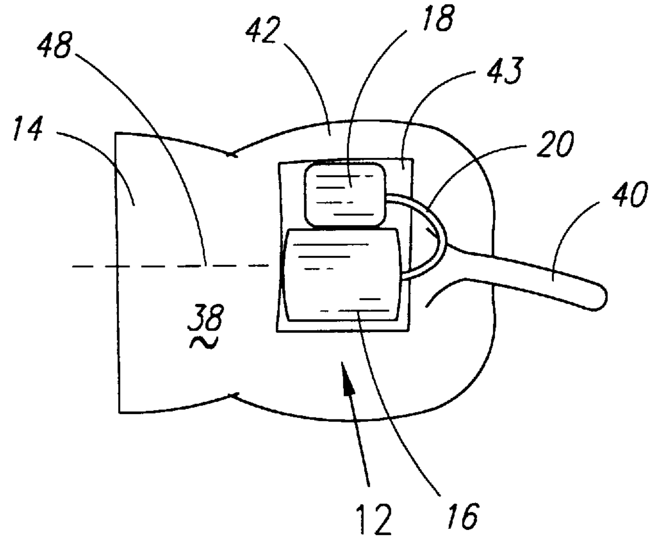
Fig. 7
Fig. 8
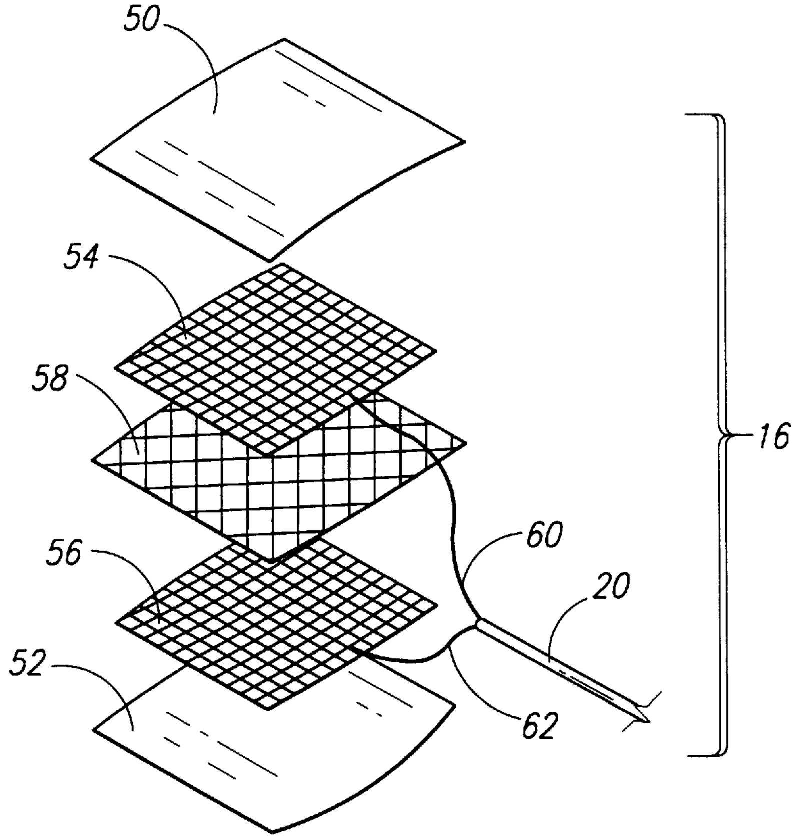

HEAT DETECTION SYSTEM

BACKGROUND OF THE INVENTION

1. Field of the Invention

The present invention relates to a system for detecting and recording activity relating to when cows come into heat. More specifically, the present invention employs recording units which are secured to individual cows to record data relating to when a cow is mounted and employs a hand held unit which communicates via a radio frequency current with each recording unit to collect information from and to reset the memory on the recording units.

2. Description of the Related Art

It is desirable for dairymen and cattle breeders to know when a cow is coming into heat. The term "coming into heat" refers to the beginning of the estrous cycle in a cow. By knowing when a cow comes into heat, cattle breeder can identify the ovulation time period for the cow. With this information, the cow can be successfully artificially inseminated during the relatively short ovulation time period. Success in inseminating a cow translates into increased calves per unit time and in desired milk production. Failure to achieve pregnancy can cost the cattleman a great deal of money, both in production of calves and in production of milk.

The present invention addresses this problem by providing individual monitoring units which are secured to the backs of cows for recording the time and date when each cow is first mounted, the number of mounts and the time and date of the last mount.

The present invention is also provided with a hand held unit which can receive data from each individual monitoring unit and can also reset the individual monitoring units. The hand held unit is provided with a digital display on which data may be displayed and is provided with means to connect to a computer for downloading data to the computer.

One object of the present invention is to provide an accurate and reliable tool for indicating when a cow comes into heat.

A further object of the invention is to provide a cost effective means for owners of small or large cattle herds to monitor their cows for purposes of determining the timing of artificial insemination.

A further object of the invention is to provide cattlemen a quick and easy way to monitor their cattle for the onset of ovulation.

A final object of the invention is to provide a tool for detecting onset of a cow's estrous cycle which can be checked frequently without disturbing or disrupting the normal behavior of the cow.

SUMMARY OF THE INVENTION

The present invention is a system for detecting when a cow comes into heat based on mounting activity for the cow. The system employs a hand held receiving unit and a plurality of recording units, with each recording unit secured to the back of a separate cow. Each recording unit has been mechanically set via switches or ports contained within the recording unit to be uniquely identified by one group number, from possible group numbers 1 through 8, and by one unit number, from possible unit numbers 1 through 16. Each recording unit is provided with a cushioned switch that mounts on the cow's back and that closes an electrical circuit whenever the cow is mounted. The circuit must remain closed for a preselected time interval, such as 5 seconds, in order for the circuit closure to be sensed by the recording unit as a mount. Each recording unit also is provided with an internal counter for recording time elapsed since the first mount, an internal counter for recording time elapsed since the last mount and an internal counter for recording the number of mounts which have occurred since the internal counters were last cleared remotely by a radio frequency communication from the receiving unit.

The receiving unit can remotely and selectively poll the recording units to obtain from them data recorded by the three counters provided in each recording unit. In sending this data to the receiving unit, each of the recording units first transmits to the receiving unit its unique group and unit numbers, followed by the data from the three counters so that when this information is received, the receiving unit is able to identify the cow from whom the data was sent. Data on first and last mounts for each cow is converted by the receiving unit into date and time of first and last mount. Data for individual cows, including number of mounts during a monitoring period and the dates and times of first and last mount during that monitoring period may be viewed on the display provided on the receiving unit or may be downloaded via a computer port provided on the receiving unit to a computer where the data may be stored, analyzed or printed to a hard copy.

BRIEF DESCRIPTION OF THE DRAWINGS

FIG. 7 is a top view of the remote monitoring unit of FIG. 3, showing an alternate mounting position on the back of the cow.

FIG. 8 is an exploded view of the switch portion of the remote monitoring unit of FIG. 3.

DETAILED DESCRIPTION OF THE PREFERRED EMBODIMENT

Invention

Figure 1:
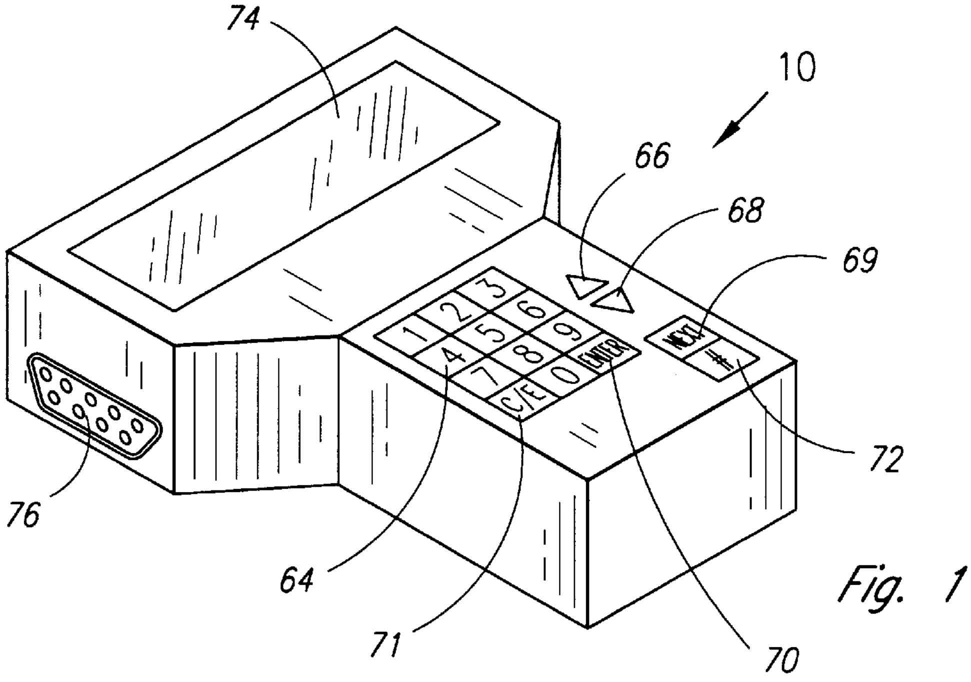
FIG. 1 is a perspective view of a hand held receiving unit of the present invention.
Figure 2:
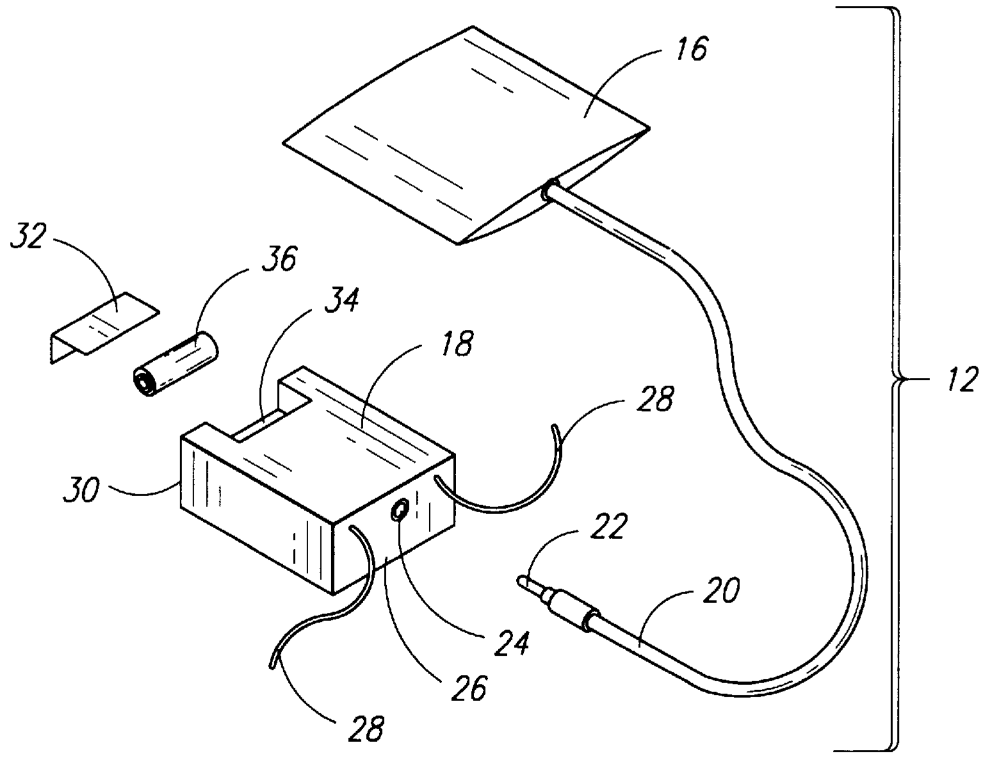
FIG. 2 is a perspective view of a remote monitoring unit of the present invention.
Figure 3:
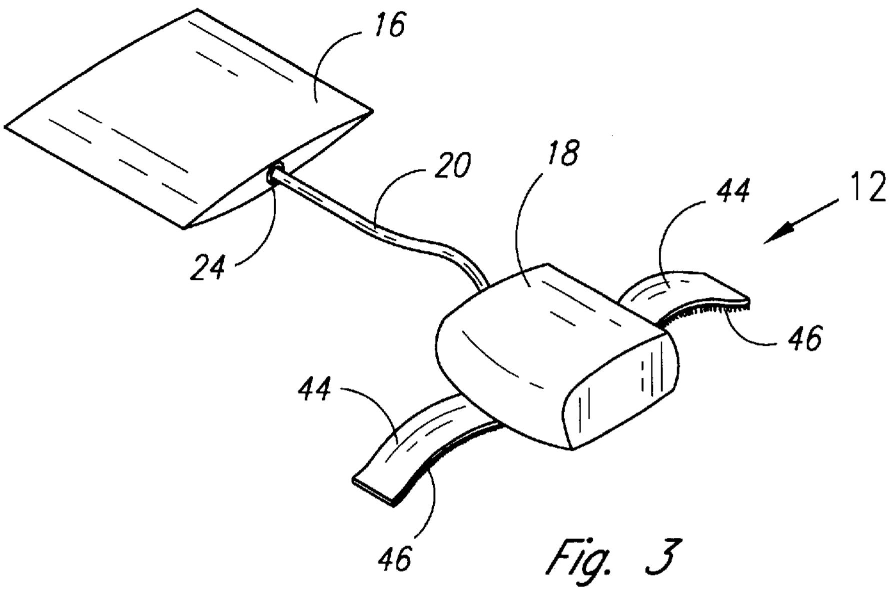
FIG. 3 is the remote monitoring unit of FIG. 2, shown assembled.

Referring now to the drawings and initially to FIG. 1, there is illustrated a hand held receiving unit 10 which a cattleman can carry with him to receive information on his cattle. Referring now to FIGS. 2 and 3, there is illustrated a recording unit 12 which is secured to cow 14 for the purpose of recording information on when the cow 14 is mounted.

As illustrated in FIG. 2, the recording unit is provided with a switch 16 which removably connects to a recording unit box 18 via a cable 20. The cable 20 is provided with a connecting end 22 that removably inserts into a cable receiving opening 24 provided on a first end 26 of the recording unit box 18. The first end 26 is also provided with antenna 28 for receiving radio frequency transmissions from and transmitting radio frequency transmissions to the receiving unit 10, as will be further explained hereafter.

The recording unit box 18 is provided on an opposite second end 30 with a removable cover 32 which conceals a battery compartment 34 for receiving a battery 36, such as for example the "AA" size battery illustrated in FIG. 2. The battery 36 provides the power necessary for operating the recording unit 12.

Figure 4:
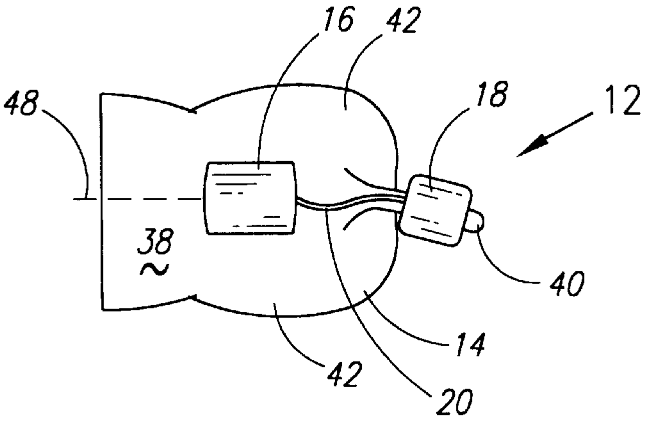
FIG. 4 is a top view of the remote monitoring unit of FIG. 3, shown mounted on a back and tail of a cow.
Figure 5:
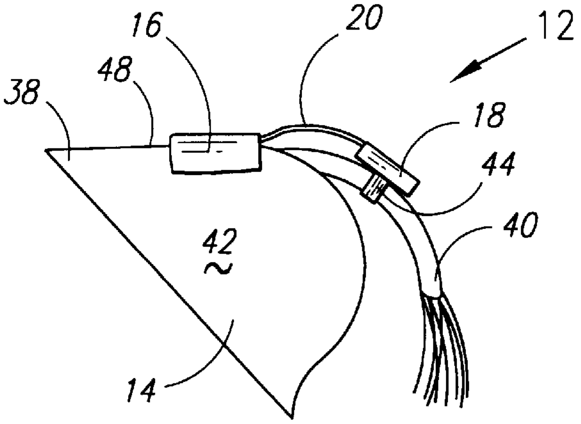
FIG. 5 is a side view of the cow and remote monitoring unit of FIG. 4.

The switch 16 and recording box 18 of recording unit 12 are secured respectively to a back 38 and tail 40 of the cow 14, as illustrated in FIGS. 4 and 5, or alternately, to the back 38 and side 42 of the cow 14, as illustrated in FIG. 7. In order to secure the recording unit 12 to cow 14, the switch 16 is first glued to the back 38 with animal grade adhesive, such as tail and leg adhesive for show calves or such as the adhesive commonly used to apply stickers to cattle at a sale barn. The recording unit box 18 is then secured either to the tail 40 or to the side 42. The recording unit box 18 is secured to the side 42 with animal grade adhesive, or alternately, to the tail 40 by means of adjustable straps 44 provided on the recording unit box 18.

As illustrated in FIG. 7, when the recording unit box 18 is to be secured to the side 42 both the switch 16 and the recording unit box 18 can alternately be first secured to a common piece of flexible material 43 and then the piece of flexible material 43 can then be secured to the cow 14, as previously described.

When the recording unit box 18 is secured to the tail 40, the straps 44 are preferably provided with mating fasteners 46, such as hook and loop fasteners produced under the brand name of VELCRO® fasteners. The fasteners 46 enable the straps 44 to form a loop around the tail 40 in order to secure the recording unit box 18 thereto.

It is important that the recording unit box 18 not be secured to the back 38 of cow 14 along the spine 48 of the cow 14 since placement along the spine 48 can result in injury to the cow 14 and can result in spinal swelling due to the increased pressure exerted on the spine 48 at the point underlying the recording unit box 18 whenever the cow 14 is mounted by another animal.

Placement of the switch 16, however, is preferably along the spine 48 so that when the cow 14 is mounted, pressure exerted on the back 38 of the cow 14 by the other animal causes an electrical circuit within the switch 16 to be closed. Closure of this electrical circuit is sensed by the recording unit box 18 and, if of sufficient duration, is recorded by the recording unit box 18 as a mount.

Referring now to FIG. 8, the structure of the switch 16 is illustrated. The external top and bottom surfaces 50 and 52 of the switch 16 are preferably constructed of an adhesive backed, closed cell polyethylene foam. The foam serves to cushion the switch 16 and the back 38 of the cow 14 from mounting impact so that neither is injured as a result of the mounting. The foam top and bottom surfaces 50 and 52 also are electrically non-conductive. It is important that the foam be electrically non-conductive to protect the cow 14 from the two electrically conductive pieces of copper mesh 54 and 56 separated by a non-conductive neoprene mesh 58 which lie between the top and bottom surfaces 50 and 52. The conductive pieces of copper mesh 54 and 56 are electrically connected respectively to electrical leads 60 and 62 contained within the cable 20. A direct electrical current is constantly applied to one lead, either 60 or 62, and the recording unit box 18 monitors the leads 60 and 62 to detect when the mesh 54 and 56 are pushed together so they are touching through openings in the neoprene mesh 58, as indicated by the existence of an electrical current in both leads 60 and 62. The foam top and bottom surfaces 50 and 52 also float in water.

This is particularly useful should the cow 14 knock the switch 16 in a pond since the switch 16 will float and can be retrieved by the cattleman.

The switch 16 is preferably comprised of two sheets of polyethylene foam 50 and 52 and two pieces of flexible copper mesh 54 and 56. The two pieces of copper mesh 54 and 56 are normally separated from each other by a piece of flexible neoprene mesh 58. A switch 16 constructed in this manner is flexible and cushioned and is unlikely to cause injury to the cow 14 to which it is secured, even when the cow 14 is mounted by another animal.

Referring now again to FIG. 1, the receiving unit 10 is provided with numeric buttons 64 for numerals 0 through 9, an "up arrow" button 66, a "down arrow" button 68, a "next" button 69, an "enter" button 70, a clear entry "(C/E)" button 71, and a "#" button 72. The functions of each of these buttons 64, 66, 68, 69, 70, 71 and 72 will be described in detail hereafter in association with both the receiving unit 10 and the recording units 12. The receiving unit 10 is also provided with a display 74, such as a LED, for displaying data and with a computer connection port 76 for optionally downloading data to a computer (not illustrated) for storage, analysis and printing of data.

In usage, the system comprising the present invention consists of one receiving unit and multiple recording units 12, with each recording unit 12 being secured to a separate cow 14 in one or more herds of cattle.

Operation

The operation of the invention will be described with reference to FIGS. 6 and also to FIGS. 1 and 2 for the specific operation of the receiving unit 10 and the recording units 12.

The hand held receiving unit 10 may be activated by pressing the # button 72. Activation of the receiving unit 10 causes the display 74 to show a Main Menu 78, which is shown within box 78 in FIG. 6.

Three options are available to the user in the Main Menu 78. The first option is to "Upload From Units" 80. The second option is to "View Unit Data" 82. The third option is to "Setup" 84. A user can select one of the three numbered options 80, 82 or 84 by employing the corresponding numeric buttons 64. Selection of additional options on the receiving unit 10 are made employing this same procedure.

For purposes of illustrating operation of the invention, the "Setup" option 84 is first selected. Selection of the "Setup" option 84 causes a Select Option Menu 86 to be shown on the display 74. The Select Options Menu 86 is shown within box 86 in FIG. 6.

The Select Options Menu 86 presents two options to the user. The first option is Change Date/Time 88 and the second option is "Add/Delete/Clear Unit" 90. The first option can be selected to change the current calendar date and time within the receiving unit 10. A new date and time may be entered by employing the various numeric buttons 64. The receiving unit 10 is the portion of the invention which has a clock and calendar. The recording units 12 have no calendar and no clock but simply count time in one second increments from the first happening of an event, such as a first mount of a cow 14, as will be more fully explained hereafter.

The "Add/Delete/Clear Unit" option 90 is selected by pressing the numeric button 64 corresponding to the numeral "2". Selection of the "Add/Delete/Clear Unit" option 90 causes a Unit Setup Menu 92 to be shown on the display 74. The Unit Set Up Menu 92 is shown within box 92 in FIG. 6.

The Unit Setup Menu 92 presents two further options to the user. The first option is "Edit or Add ID#" 94 and the second option is "Reset Cow Unit" 96. The "Edit or Add ID#" option 94 allows the user to edit information contained within the receiving unit 10. Specifically, the information contained within the receiving unit 10 consists of information relating to each recording unit 12 and the cow 14 on which each recording unit 12 is secured. This information consists of its unit number, its group number and its identification number, or simply ID#. The "Edit or Add ID#" option 94 allows the user to assign a cow number to a given unit and group. The user assigns each cow its own unique identification number which the cattleman can cross reference with a list of his cows. The user also assigns each cow number to a unit within a group. Assignment of a cow to a unit and group is done for purposes of allowing the receiving unit 10 to be able to associate the data it receives from the various recording units 12 with particular cows 14 on which those recording units 12 are secured. Data received by the receiving unit 10 from a particular recording unit 12 attached to a certain cow 14, as identified by that cow identification number, is identifiable by the receiving unit 10 as having originated from a given unit number and a given group number. The recording unit 12 which is secured to a particular cow 14 is setup as a given unit number and group number by setting two switches contained within the recording unit 12, a unit switch and a group switch. The unit switch can be set for a number 1 through 16 by the 16 position unit switch or pot and the group switch can be set for a number 1 through 8 by the 8 position group switch or pot. Thus, when the receiving unit 10 and the recording unit 12 communicate with each other via radio frequency waves, the receiving unit 10 precedes it messages with the numeric unit and group numbers of those recording units 12 with which it desires to communicate so that only the desired recording units 12 will "listen" to the receiving unit's 10 requests for data and its instructions to clear the recording units' 12 memory and reset counters which is being broadcasted by the receiving unit 10. Also the recording units 12 precede data transmissions they are sending to the receiving unit 10 with their preset unit and group numbers so the receiving unit 10 will know from which recording unit 12, and thus, from which cow, the data it is receiving has originated. The receiving unit 10 knows which recording unit 12 is secured to a particular cow because the receiving unit 10 is able to identify the unit and group numbers for that cow ID# and this is the same unit and group setting for the unit and group switches contained within the recording unit 12.

Selection of the "Reset Cow Unit" option 96 causes the receiving unit 10 to transmit a radio frequency signal which is received by each of the user designated recording units 12 and causes each of those recording units 12 to clear its memory of any previous counts and to zero its counter in anticipation of a new period of recording mounts.

After the recording units 12 have been reset, whenever an animal mounts a cow 14 being monitored, the pieces of copper mesh 54 and 56 provided within the switch 16 secured to that cow 14 are pressed together and contact each other via the openings in the neoprene mesh 58, thus closing the DC circuit. Closure of the circuit is sensed by recording unit box 18 of the recording unit 12 and if the circuit remains closed for a time exceeding a length of time previously preset in the recording unit 12, such as for example normally approximately five (5) seconds, is simultaneously then a first mount time counter contained within the recording unit 12 is activated and a mount number counter, which is also provided within the recording unit 12, advances by one numeral. A second mount of the same cow 14 which exceeds in duration the preset time limit also advances the mount number counter by one numeral and activates a last mount time counter. Any subsequent mount of the same cow 14 which exceeds in duration the preset time limit, advances the mount number counter by one numeral and resets and reactivates the last mount time counter. Thus at the end of any given monitored period, each recording unit 12 contains a maximum of three pieces of information: a counter reading corresponding to the number of seconds that have transpired since the first mount of the cow 14, a counter reading corresponding to the number of seconds that have transpired since the last mount of the cow 14, and a counter reading corresponding to the number of times the cow 14 was mounted.

Figure 6:
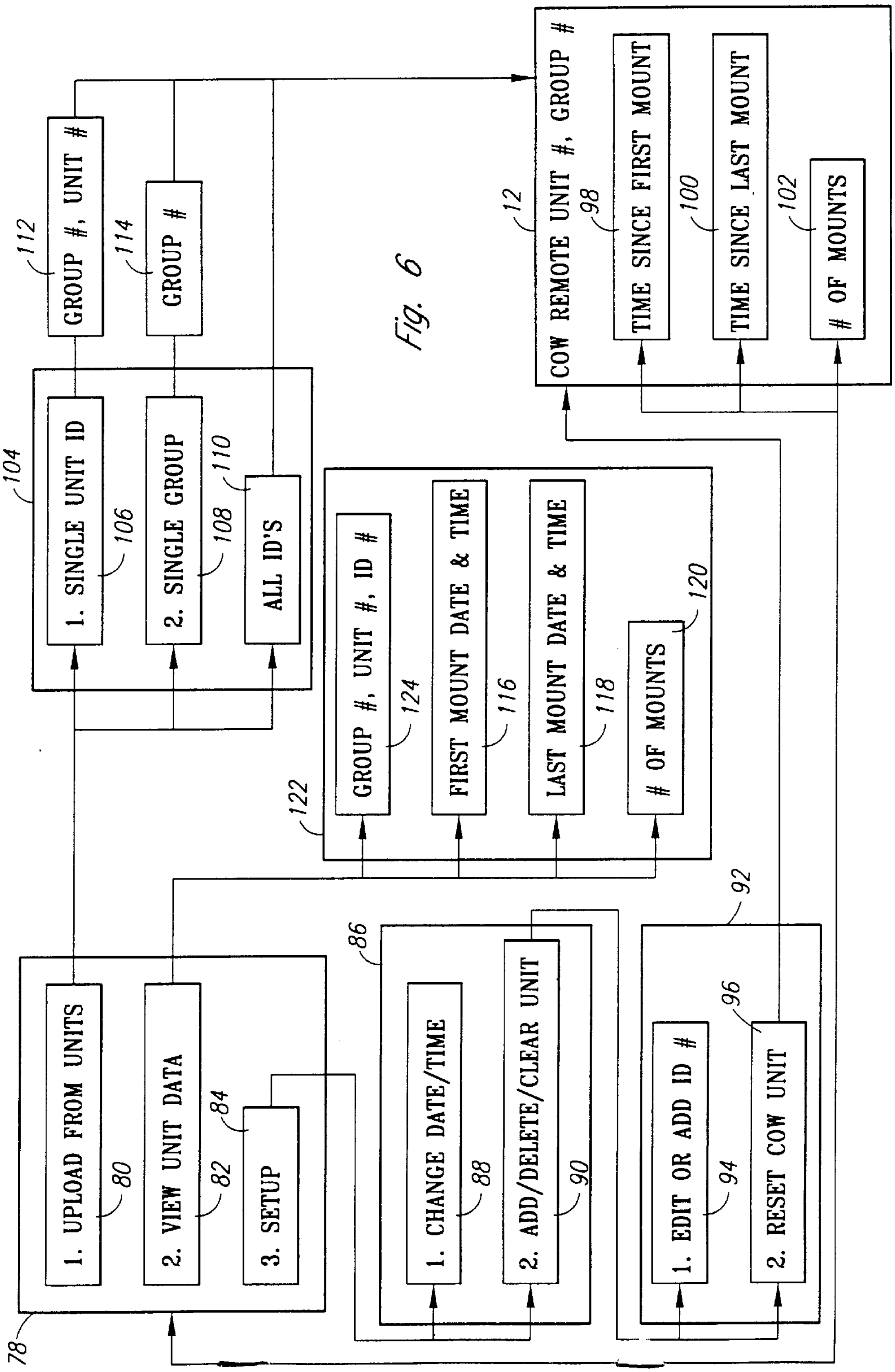
FIG. 6 is a schematic showing how the present invention functions.

The process which occurs in each of the recording units is shown in box 12 in FIG. 6 with box 98 representing the first mount time counter, 100 representing the last mount time counter and 102 representing the mount number counter.

This process of counting these three parameters is repeated on the recording unit 12 for each cow 14 which is mounted during the period of time being monitored.

After the user has initially setup the date and time on his receiving unit 10, has entered into the receiving unit 10 the correct identification information for his cattle and has, via the receiving unit 10, remotely reset the recording units 12 which are attached to the cows 14, he will wait a period of time, such as a day, to allow those cows 14 which are coming into heat to be mounted and for this activity to be monitored by the various recording units 12. The receiving unit 10 is designed to automatically shut itself off after 45 seconds of inactivity by the user.

After the waiting period or monitoring period has elapsed, the user reactivates the receiving unit 10 by pressing the # button 72 provided thereon.

As previously described, the Main Menu 78 appears on the display 74 upon reactivation of the receiving unit 10. This time the user will select the "Upload From Units" option 80.

Upon selection of the "Upload From Units" option 80, the user is presented with an Upload Menu, represented as box 104 in FIG. 6.

The Upload Menu 104 presents three options: uploading information from a single recording unit 12 which is a "Single Unit ID" option 106, uploading information from all recording units 12 assigned to a given group number which is a "Single Group" option 108, or uploading information from all recording units 12 which is an "All IDS" option 110.

If option "Single Unit ID" 106 is selected, the user will be requested by appropriate messages appearing in the display 74 to enter the group number and unit number of the single recording unit 12 for which the user is requesting data be uploaded to the receiving unit 10, as shown by box 112. The user uses the Next button 69 to find the group number and the up and down arrow buttons 66 and 68 to find the unit number. The Enter button 70 is then pressed to enter the data into the receiving unit 10.

Likewise, if option "Single Group" 108 is selected, the user will be requested by appropriate messages appearing in the display 74 to enter the group number for the recording units for which the user is requesting data to be uploaded to the receiving unit 10, as shown by box 114.

If the "All IDS" option 110 is selected or if the necessary information has been entered after selecting either option 106 or 108, the receiving unit 10 makes no further requests of the user but instead proceeds with radio frequency communication to all the recording units 12, directing that each of the previously designated recording units 12 transmit to the receiving unit 10 its counter reading for "Time Since First Mount" 98, "Time Since Last Mount" 100, and "# of Mounts" 102. This information is sent to the receiving unit 10 from each of the recording units 12 which were polled and the receiving unit 10 converts the raw counting information relating to times of first and last mount to dates and times for first and last mount. The receiving unit 10 then stores in its memory this information and the information on number of mount for each recording unit 12. This information is stored in association with the group and unit number of the recording unit 12 from which the information was received so that the cattleman can determine from which cow each set of data was received.

In order for the user to view the data, which was received by the receiving unit 10 from those recording units 12 which were polled, the user must return to the Main Menu 78 by pressing the # button 72 and then select the "View Unit Data" option 82. The user may then select the group and unit numbers, or alternately, the ID# for the individual cows 14 in order to view on the display 74 the "First Mount Date and Time" 116, the "Last Mount Date and Time" 118, and the "# of Mounts" 120. This information is visible on the display 74 as a Data Menu, shown as box 122 in FIG. 6. Box 124 represents the identifying information, the group #, the unit #, and the ID# for the cow 14 for which the first, last mount dates and times 116 and 118 and the number of mounts 120 is being displayed.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A system for detecting when a cow comes into heat based on mounting activity comprising at least one recording unit securable on a back of a cow, a switch provided on each recording unit for closing an electrical circuit within the at least one recording unit whenever the cow is mounted, electrical means provided in said at least one recording unit for translating closing of the electrical circuit into mounts, counting means provided in each recording unit to count number of mounts and elapsed times since first and last mounts, a receiving unit in interactive radio frequency communication with each said at least one recording unit, said receiving unit selectively providing instructions to the at least one recording unit to reset each counting means, said receiving unit selectively providing instructions to the at least one recording unit to transmit readings from its counting means to said receiving unit, and said at least one recording unit being responsive to instructions received from said receiving unit by resetting said counting means and by transmitting readings from said counting means to said receiving unit when so instructed by said receiving unit.

2. A system according to claim 1 wherein more than one recording unit is employed, and each recording unit securable to a back of a different cow.

3. A system according to claim 1 wherein said switch further comprises two pieces of flexible electrically conductive mesh separated by a flexible electrically non-conductive mesh, so that an open electrical circuit normally exists between the two pieces of conductive mesh, said non-conductive mesh being provided with large mesh openings therethrough such that the two pieces of conductive mesh contact each other via the large mesh openings when compressive pressure is applied thereto, and said conductive and non-conductive meshes sandwiched between an upper and a lower electrically non-conductive surface.

4. A system according to claim 3 wherein said upper and lower non-conductive surfaces are closed cell polyethylene foam.

5. A system according to claim 1 further comprising a display provided on said receiving unit for viewing data readings transmitted to said receiving unit from each recording unit.

6. A system according to claim 1 further comprising said receiving unit being provided with a computer port for connecting said receiving unit to a computer so data can be downloaded to the computer for storage, analysis and printing.

7. A system for remotely monitoring an animal for mount activity comprising at least one recording unit securable to an area of an animal's body where the animal is mounted by another animal, a pressure activated switch provided on said at least one recording unit which is activated whenever the animal is mounted, counters provided in said at least one recording unit, said counters operatively connected to said switch so they count number of mounts and elapsed times since a first mount and since a last mount, a receiving unit located remotely from each said at least one recording unit, said receiving unit in radio frequency communication with each said at least one recording unit so that the counters of the recording units can be reset remotely under instructions transmitted to them by the receiving unit and can be polled by the receiving unit to transfer count information to the receiving unit.

* * * * *